(12) United States Patent
Thompson et al.

(10) Patent No.: US 8,613,159 B2
(45) Date of Patent: Dec. 24, 2013

(54) PLANT TRAINING AND REMOVAL APPARATUS

(76) Inventors: Donald Thompson, Flint, MI (US);
Donald L Thompson, Flint, MI (US)

( * ) Notice: Subject to any disclaimer, the term of this patent is extended or adjusted under 35 U.S.C. 154(b) by 0 days.

(21) Appl. No.: 13/410,231

(22) Filed: Mar. 1, 2012

(65) Prior Publication Data

US 2013/0227882 A1    Sep. 5, 2013

(51) Int. Cl.
*A01G 9/12* (2006.01)
*A01G 17/06* (2006.01)
*A01G 17/14* (2006.01)

(52) U.S. Cl.
USPC .................................................. 47/70; 47/47

(58) Field of Classification Search
USPC ............................................. 47/47, 66.6, 70
See application file for complete search history.

(56) References Cited

U.S. PATENT DOCUMENTS

| 548,508 | A | * | 10/1895 | Bjelland | 47/47 |
|---|---|---|---|---|---|
| 3,165,863 | A | * | 1/1965 | Duran | 47/47 |
| 4,074,461 | A | * | 2/1978 | Hirschman | 47/70 |
| 5,425,203 | A | * | 6/1995 | Scott | 47/70 |
| 5,987,815 | A | * | 11/1999 | Payr | 47/70 |
| 6,209,258 | B1 | * | 4/2001 | Schneider | 47/46 |
| 6,302,368 | B1 | * | 10/2001 | Tsappi | 248/523 |
| 2005/0102894 | A1 | * | 5/2005 | Jocelyn | 47/47 |
| 2008/0209806 | A1 | * | 9/2008 | Van Zijl | 47/70 |
| 2008/0263944 | A1 | * | 10/2008 | McGaughey | 47/70 |
| 2009/0272032 | A1 | | 11/2009 | Kiff, Sr. | |

* cited by examiner

*Primary Examiner* — Monica Williams
(74) *Attorney, Agent, or Firm* — Mitchell Law PLLC; Matthew W. Mitchell

(57) ABSTRACT

An apparatus is disclosed for easy removal of potted and trained plants from a plant container. The apparatus includes an elongated support member configured to assist plant training, and an elliptical-shaped support base connected to the elongated support member and configured to removably support a plant. Embodiments of the apparatus include support arms asymmetrically disposed on the elongated support member to upwardly support a plant.

8 Claims, 5 Drawing Sheets

PLANT TRAINING AND REMOVAL APPARATUS

TECHNICAL FIELD

This disclosure is related to plant cultivation and more particularly to plant training and repotting.

BACKGROUND

The statements in this section merely provide background information related to the present disclosure and may not constitute prior art.

For particular plant varieties, plant propagation and cultivation preferentially requires shaping of a plant and plant canopies. Training is a method of growth control that allows one to shape their canopy to facilitate photosynthesis, and control growth and plant yield. Tying, bending, crimping and topping are all conventional training methods. For particular plant varieties, it is desirable to train branches, vines and/or stems upward. In many plant varieties, plants outgrow pots or other housing container. Repotting plants that are trained around and/or intertwined to a training apparatus can be difficult as moving rot systems with the trained apparatus can result in plant damage, particularly in sensitive plant varieties.

Therefore, it would be advantageous to produce an apparatus whereby the training apparatus and rot system are concurrently moveable.

SUMMARY

A plant training and removal apparatus is disclosed. The apparatus may be used for easy removal of potted and trained plants from a plant container and to assist in plant training. The apparatus includes an elongated support member configured to assist plant training, and an elliptical-shaped support base connected to the elongated support member and configured to removably support a plant. Certain embodiments of the invention include a feature of support arms asymmetrically disposed on the elongated support member to upwardly support a plant.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
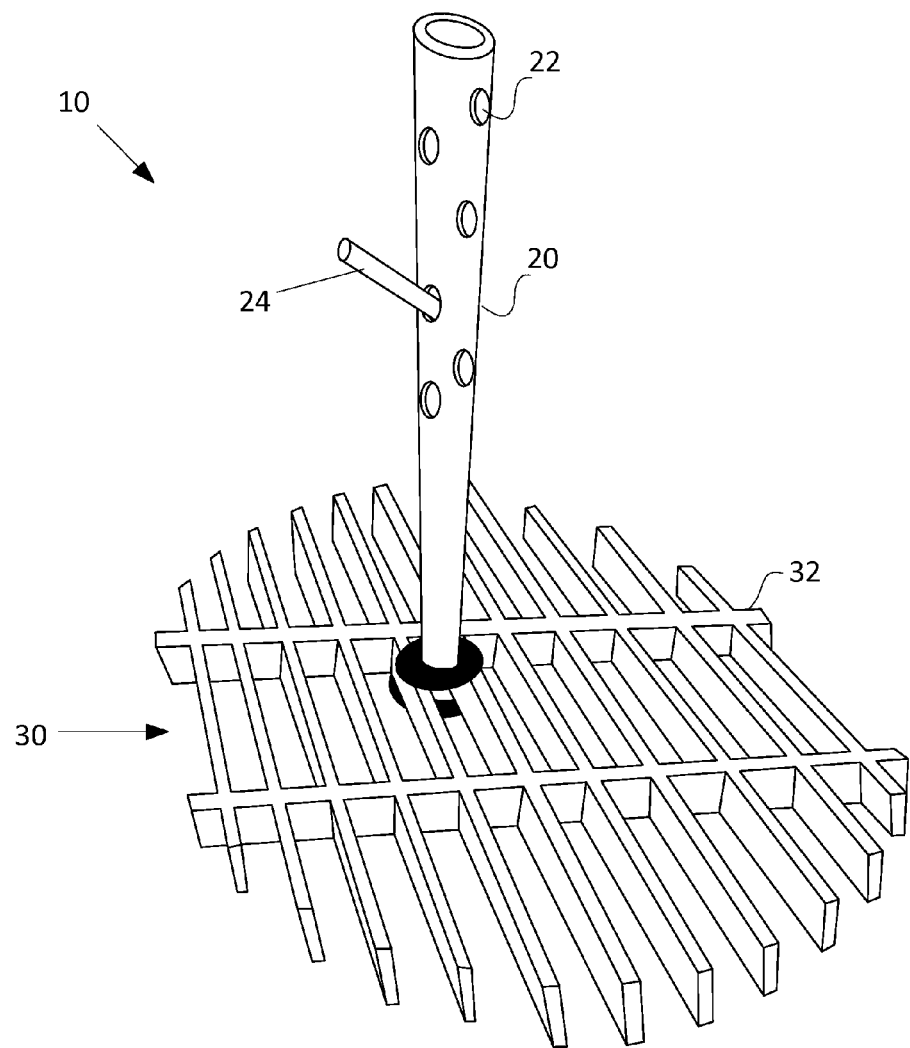
FIG. 1 schematically shows a perspective view of the apparatus, in accordance with the present disclosure.

Referring now to the drawings, wherein the depictions are for the purpose of illustrating certain exemplary embodiments only and not for the purpose of limiting the same, FIG. 1 illustrates a plant training and removal apparatus 10. The apparatus 10 includes an elongated support member 20 configured to assist plant training and a support base 30. In one embodiment, the support member 20 is a hollow, cylindrical-shaped body. The support member 20 may be configured with a plurality of symmetrically or asymmetrically disposed receiving apertures 22 configured to receive a support arm 24. The support arm may be included to further support plant training by providing a structure to support portions of a plant. The support member 20 includes an annulus-shaped top cap 21 integrally formed or contiguously formed to a bottom end. The top cap 21 is configured to press against the support base when connected. The support member 20 can be formed to various sizes or shapes adapted for a particular plant variety or plant containers, hence the disclosure herein is not intended to be limited to any particular shape or size.

The support base 30 is preferably elliptical-shaped, configured to fit within a conventional plant pot flush on top of a base or bottom portion. The support base 30 is configured to receive the support member 20. In one embodiment, the support base 30 is configured to slidably connect with the support member 20. The support base is depicted in FIG. 1 as having a grid-shaped support base 30. One skilled in the art will readily appreciate that the size and arrangement of a support structure of the support base 30 may vary as adapted for particular plant containers. To this end, the present disclosure is not to be construed as limited to the size proportions and arrangement of members of the support structure depicted in exemplary illustration in FIG. 1.

Figure 2:
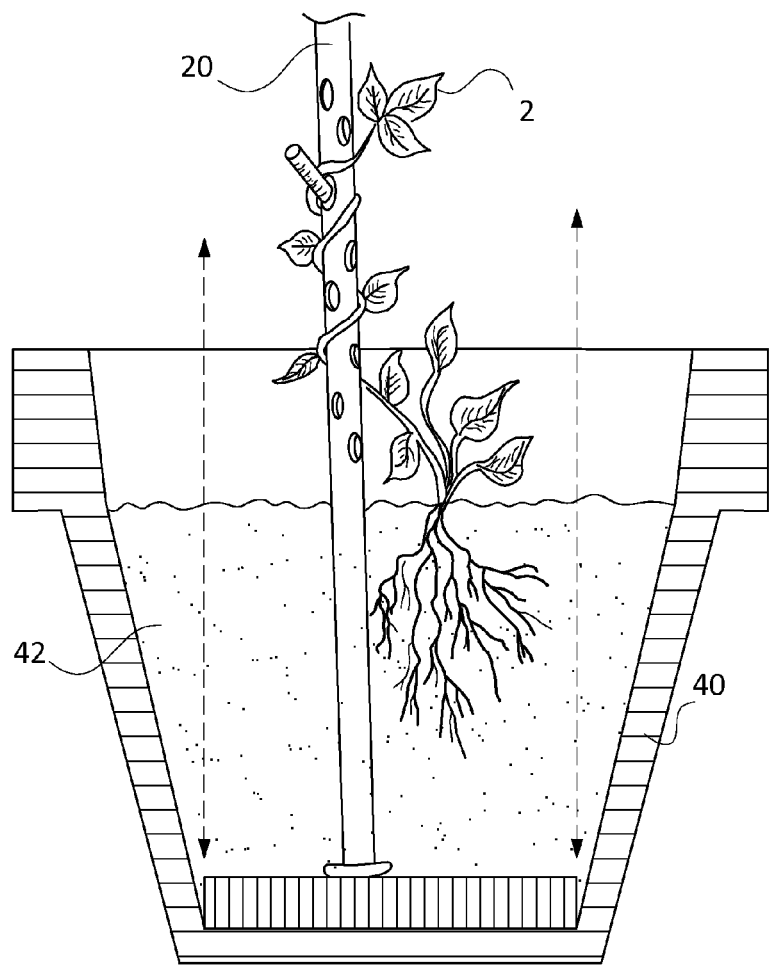
FIG. 2 shows a cross-sectional view of the apparatus inserted into a pot, in accordance with the present disclosure.

FIG. 2 shows a cross-sectional view of the apparatus 10 inserted into a plant container 40. As FIG. 2 shows, the support member 20 is preferably connected to the support base 30 at substantially a 90-degree angle. In use, soil 42 or other plant-nurturing material is positioned over the support base 30. The plant 2 is free to grow within the soil 42 and upwards around the support member 20. The support base 30 is preferably adapted to fit within a plant container 40. It is contemplated by this disclosure that the support base 30 may be adapted for conventional frustoconical-shaped plant pots having conical-shaped walls configured to direct water and nutrients downwardly. Plant containers generally have a drain opening configured to permit water escape from the plant container. The support base 30 is configured to permit water to permeate from a top position of the support base 30 to a bottom position of the support base 30. The disclosure herein can be applied to various plant containers and is therefore not intended to be limited thereby.

Figure 3:
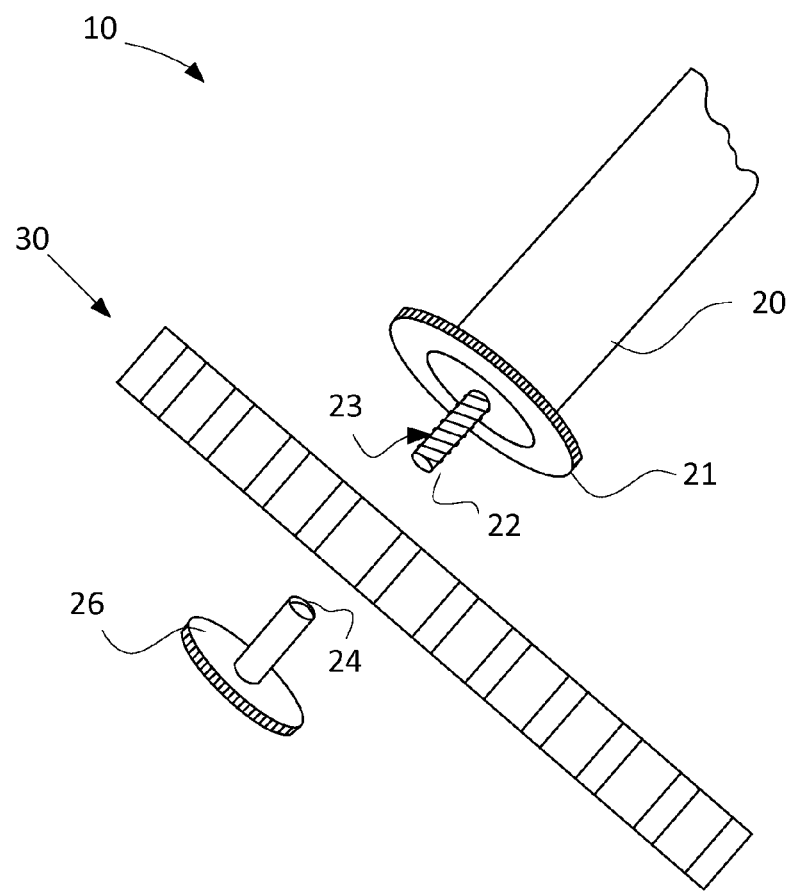
FIG. 3 is an exploded view of the apparatus, in accordance with the present disclosure.

FIG. 3 is an exploded side view of the apparatus 10 showing an embodiment of a mechanical fastener system that may be used to slidably connect the support member 20 to the support base 30. As FIG. 3 shows, the support member 20 includes a fastening component 22 configured to thread into a receiving aperture having correspondingly internal threads. The fastening component 22 is preferably circularly-shaped and includes threads 23 spirally grooved on a surface. The fastening component 22 may be adapted as a simple machine of the inclined plane type, e.g., tapered, to generate compression forces when secured to a receiving aperture 24.

The receiving aperture 24 preferably includes spiral grooves configured to receive the fastening component 22. The aperture 24 may be circular-shaped and have tapered i.e., a conical-shaped decline, configured to generate compression forces when receiving the fastening component 22. The receiving aperture 24 is formed or connected to a cap 26. The cap 26 is configured to hold the support member 20 to the support base 30 when the fastening component 22 is secured within the receiving aperture 24. The fastening component 22 and aperture 24 may be any size adapted to secure the support member 20 to the cap 26.

Figure 4:
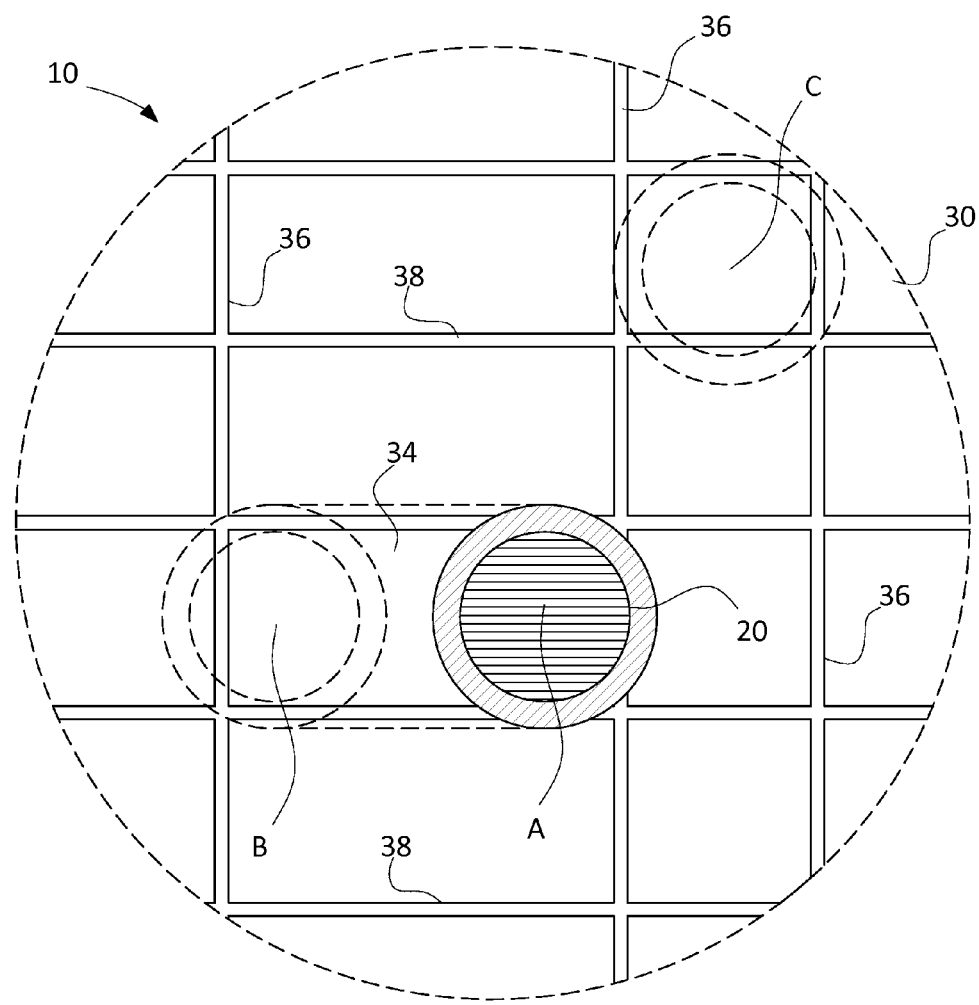
FIG. 4 shows a top view of the apparatus including a first embodiment of a grate, in accordance with the present disclosure.

FIG. 4 shows a top view of the apparatus 10. As FIG. 4 shows, the support member 20 may be slidably moved along any one of the plurality of slot(s) 34 or opening within the support base 30. The support base 30 preferably includes one or more cross members 36 and a plurality of channel members 38. The slots 34 formed from the space between the cross members 36 and the channel members 38.

In the exemplary illustration, the support member 20 may be slid from position 'A' to position 'B' and may be positioned anywhere therebetween. In some situations, sliding the support member 20 within a plant container is preferable to aid in plant training. Further, some plant varieties are preferably positioned in a center of a plant container and benefit from the support member 20 positioned in 'A' or 'B' position, while other plant varieties are preferably positioned toward a container edge, benefiting from the support member 20 positioned in a central position e.g., between position 'A' and 'B.' Further, the support member 20 may be repositioned position in any one of the plurality of slots 34 such as in exemplary position 'C.'

Figure 5:
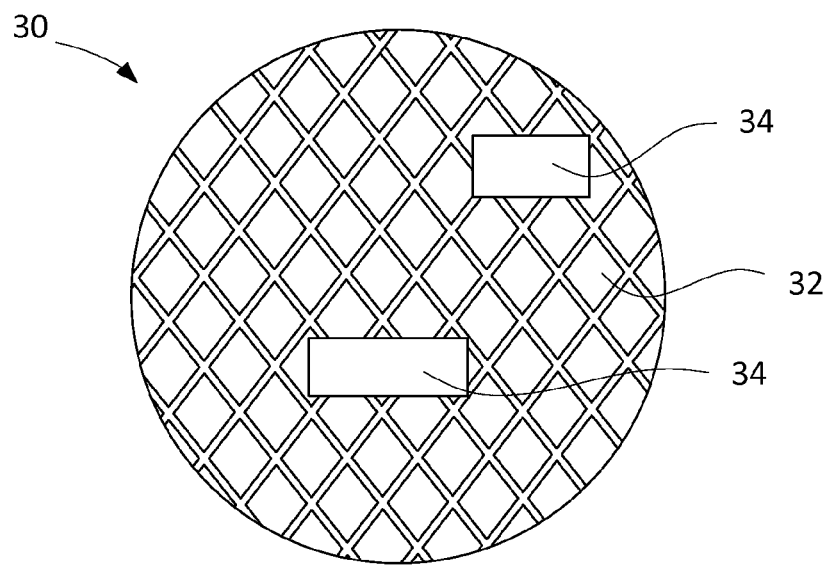
FIG. 5 shows a top view of the apparatus including a second embodiment of the grate, in accordance with the present disclosure.
Figure 6:
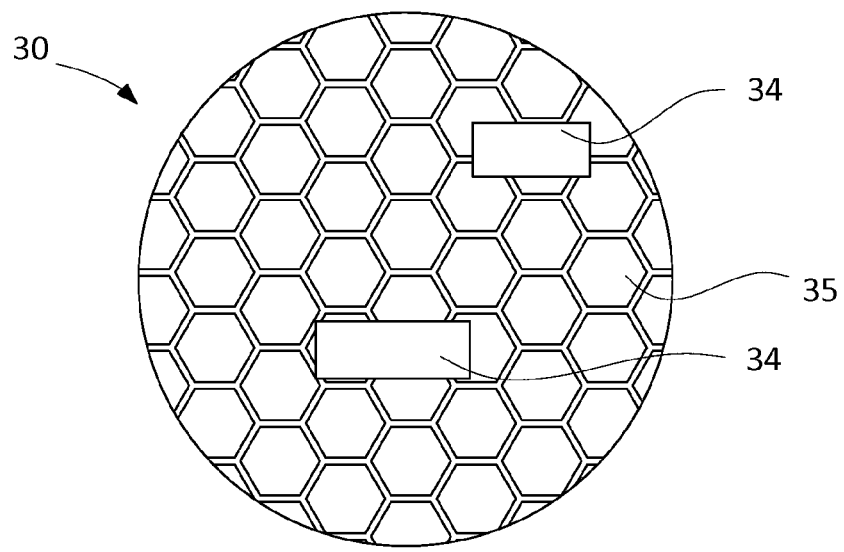
FIG. 6 shows a top view of the apparatus including a third embodiment of the grate, in accordance with the present disclosure.

FIGS. 5 and 6 show top views of the apparatus 10 depicting additional exemplary embodiments of the support base 30. As FIG. 5 shows, the support base 30 may include a support structure formed of a plurality of 4-sided cells around the slots 34. As FIG. 6 shows, the support base 30 may include a support structure formed of a plurality of hexagonal-shaped cells 35 around the slots 34. The slots 34 are configured to permit the support member 20 to slidably move within the support base 30 as described herein above. The support structure formed of a plurality of 4-sided cells 32 and the support structure formed of a plurality of hexagonal-shaped cells 35 may be connected to the gird-shaped structure described hereinabove. In this way, the cells 32 and 35 add additional support for soil and other plant nurturing material. The disclosure herein can be applied to various support structure arrangements configured to receive the support member 20 and allow water to permeate from a top position of the support base 30 to a bottom position of the support base 30 and is therefore not intended to be limited thereby.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A plant container apparatus comprising:
frustoconical-shaped body having conical-shaped walls configured to direct water and nutrients downwardly and a base configured to hold a plant;
an elongated support member configured to assist plant training; and
an elliptical-shaped support base slidably connected to the elongated support member and configured to removably support a plant within the body, wherein the elliptical-shaped support base is formed of a grid-shaped pattern, and
wherein the elongated support member comprises a threaded fastening component configured to couple within a receiving aperture having correspondingly internal threads, the receiving aperture formed to a receiving cap configured to mechanically connect the elongated support member to the support base.

2. The apparatus of claim 1, wherein the elliptical-shaped support base is formed of a hexagon-shaped pattern having at least one slot.

3. The apparatus of claim 1, wherein the elliptical-shaped support base is formed of a rhombus-shaped pattern having at least one slot.

4. The apparatus of claim 1, wherein the elongated support member is mechanically connected to the support base.

5. The apparatus of claim 1, wherein the elongated support member is hallow.

6. The apparatus of claim 1, wherein the elongated support member is hallow and comprises a plurality of receiving apertures, each configured to receive a support arm.

7. The apparatus of claim 6, wherein the receiving apertures are asymmetrically disposed upon the elongated support member.

8. A plant container apparatus comprising:
frustoconical-shaped body having conical-shaped walls configured to direct water and nutrients downwardly and a base configured to hold a plant;
a hallow, elongated support member having a plurality of asymmetrically disposed receiving apertures, each configured to receive a support arm, wherein the support member is configured to assist plant training; and
a support base formed of a grid-shaped pattern, the base slidably connected to the support member and configured to removably support a plant within the body,
wherein the elongated support member comprises a threaded fastening component configured to couple within a receiving aperture having correspondingly internal threads, the receiving aperture formed to a receiving cap configured to mechanically connect the elongated support member to the support base.

* * * * *